April 29, 1941.   I. E. COX   2,240,111
JOURNAL BEARING
Filed Sept. 20, 1940   2 Sheets-Sheet 1
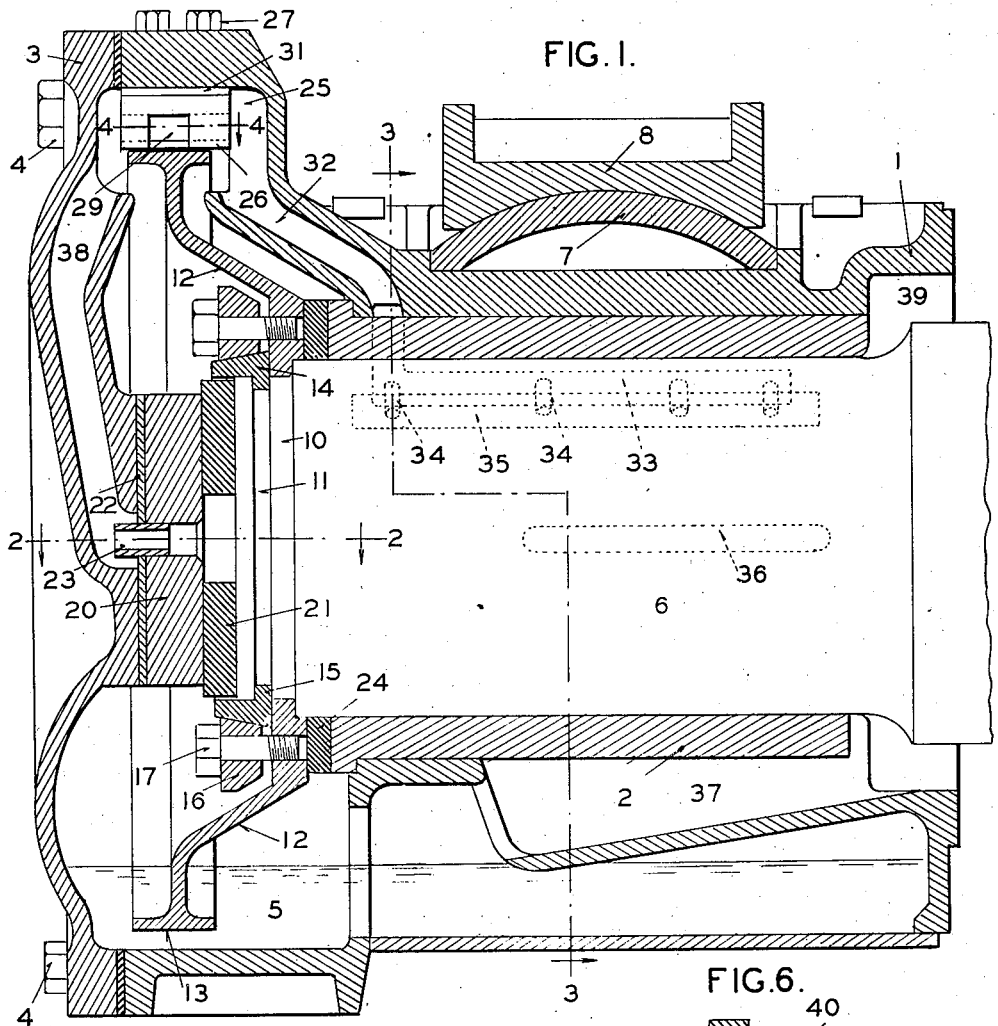
FIG. 1.
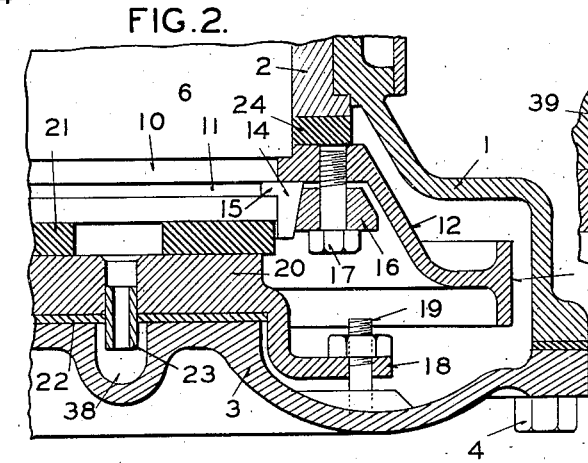
FIG. 2.
FIG. 6.
INVENTOR
I. EUGENE COX
BY
ATTORNEY April 29, 1941.  I. E. COX  2,240,111
JOURNAL BEARING
Filed Sept. 20, 1940  2 Sheets-Sheet 2
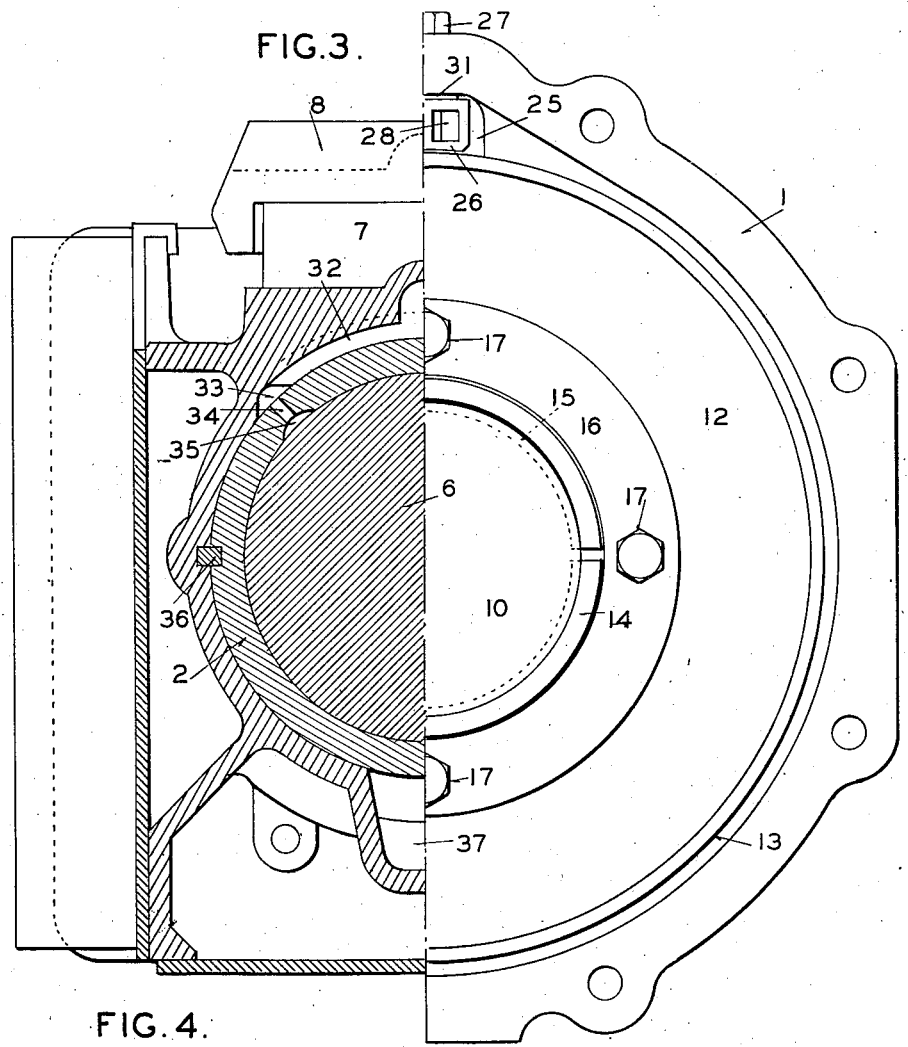
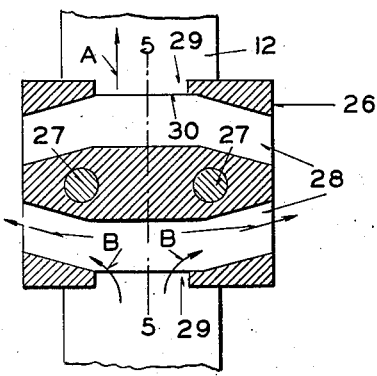
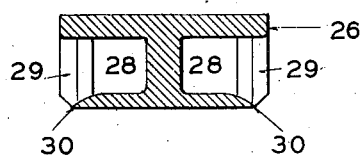
INVENTOR
I. EUGENE COX
BY
ATTORNEY Patented Apr. 29, 1941

2,240,111

UNITED STATES PATENT OFFICE 2,240,111

JOURNAL BEARING

Isaac Eugene Cox, Kirkwood, Mo., assignor to National Bearing Metals Corporation, St. Louis, Mo., a corporation of New York Application September 20, 1940, Serial No. 357,560

2 Claims. (Cl. 308—85)

My invention relates to a journal bearing and in the form shown is particularly adapted for use in railway car and locomotive axle bearings. The invention is specifically directed to that type of bearing in which the oil for lubricating the bearing is raised from a reservoir or sump in the lower part of the axle box and discharged upon the upper part of the bearing. Such a device provides the bearing with ample oil not only to lubricate it but to dissipate heat generated by friction of the bearing. In use, however, certain faults have been found to be inherent in this type of bearing as now constructed. Among these faults are the short life of the oil seal which must be of the rubbing type, and of the driving connection which must be employed because the oil raising disk is mounted on the lid of the axle box.

One object of my invention is to so construct the bearing that a non-rubbing type of oil seal may be employed. To this end I replace the usual partial bearing with a full sleeve bearing and provide other means for the self-aligning function of the structure.

Another object of my invention is to mount the oil raising disk on the axle, thus avoiding the use of driving connections for the disk. The practical application of this feature is dependent upon the use of the sleeve type bearing above referred to.

A further object of my invention is to provide floating members to take the imposed lateral thrust loads.

Further objects of my invention are to so arrange the oil circulating system as to effectively lubricate both the sleeve bearing and the thrust bearings and in general to improve the mechanical construction of the device.

In the accompanying drawings which illustrate one form of journal bearing made in accordance with my invention Figure 1 is a central longitudinal section; Figure 2 is a partial section taken on the line 2—2 of Figure 1; Figure 3 is partly a section taken on the line 3—3 of Figure 1 and partly a front view with the lid removed; Figure 4 is an enlarged section taken on the line 4—4 of Figure 1; Figure 5 is a section taken on the line 5—5 of Figure 4; and Figure 6 is an enlarged section showing one form of oil seal which may be employed with my bearing.

The numeral 1 indicates the journal box which is provided with a bore to receive a full sleeve bearing 2 pressed into position. The front end of the box is covered by a lid 3 secured in position by bolts 4. The box is so shaped as to form an oil reservoir or sump 5 at its lower end adjacent the lid. Journaled in the bearing 2 is the axle 6. As the axle is completely surrounded by the sleeve bearing, relative movement of these parts cannot be employed to provide self-alignment. I, therefore, provide the roof of the box with a convex boss or chair 7 which cooperates with an equalizer seat 8 having a concave face of the same radius as the chair permitting the necessary angular movement of the journal unit to follow the axle relative to the truck.

The end of the axle 6 is provided with a reduced portion 10 in which is formed a peripheral groove 11. Mounted on the reduced portion 10 is an oil disk 12 which is preferably flared as shown to position its peripheral oil carrying surface 13 in front of the end of the axle. The disk is secured in position by a two part locking ring 14 provided with an inwardly projecting flange 15 which engages with groove 11. The periphery of the ring is conical and engages with the correspondingly shaped conical inner face of a retaining ring 16. The ring 16 is drawn toward the disk 12 to clamp the locking ring in position by bolts 17 threaded into the disk 12. Secured to the lid 3 by means of lugs 18 and bolts 19 (Figure 2) is a thrust plate 20 to receive the end thrust of the axle. It is preferable, however, to avoid direct contact of the thrust plate with the end of the axle. I, therefore, interpose between these parts a floating thrust liner 21 preferably of fiber. This liner is held in position by the projecting end of ring 14 which extends somewhat beyond the end of the axle. Both the thrust plate and the liner are provided with central openings for the passage of oil. Placed between the lid and the thrust plate is a shim 22 to adjust the latter to limit the end thrust of the axle. A hollow stud 23 secured in the opening of the thrust plate retains the shim in position. The disk 12, in addition to its function of raising oil from the sump, forms a thrust member cooperating with the end of bearing 2. There is interposed between these parts a floating washer or disk 24 of fiber. Two floating thrust bearings are thus provided, bearing 21 taking the end thrust of the axle and bearing 24 taking the end thrust necessary to move the box in its pedestal (not shown).

The box is provided with a dome 25 in which is mounted a spoon 26 (shown in detail in Figures 4 and 5) for removing the oil from the periphery of the oil disk 12. This spoon is duplex in form so as to function when the axle is rotating in either direction. It consists of a box-shaped member secured in the dome by bolts 27. It is provided at each side with a cross-passage 28 open at both ends for the discharge of oil. Each of these cross-passages is provided with an oil inlet opening 29, the lower edge 30 of which forms a sharp lip. It is important that these openings 29 be of less width than the periphery of the disk 12 to secure the proper operation of the device. The bottom of the spoon should be very close to but out of actual contact with the periphery of the disk. To secure the proper adjustment, a shim 31 is employed which may also act as a gasket to prevent the escape of oil. By reference to Figure 4 it will be seen that when the disk is rotating in the direction indicated by arrow "A," oil will enter the spoon through opening 29 at the side of the spoon toward which the disk is traveling and be discharged at both ends of the cross-passage 28 as indicated by the arrows "B."

In the box is a cored pasage 32 for receiving oil from the rear end of the spoon. The lower end of this passage is bifurcated and extends downwardly around the bearing 2 to longitudinal passages 33 in the box. These latter passages communicate through openings 34 with longitudinal passages 35 in the inner face of the bearing. To prevent the bearing from rotating in the box and so moving passages 35 out of communication with passages 33, I provide a key 36 between the bearing and box. Return of oil leaking from the bearing to the sump is provided by an inclined passage 37. In the lid is a cored pasage 38 receiving oil from the front end of the spoon and delivering it at the center of thrust bearing 21.

The rear end of the box is provided with an enlarged bore 39 and is covered by a back plate 40. The oil seal between the box and axle may be like that shown in Figure 6 in which the cover plate 40 is provided with labyrinth grooves interlocking with grooves on a slinger 41 mounted on the axle.

In the operation of my bearing the disk 13 extends below the oil level in the sump 5 and as it rotates with the axle carries the oil up upon its periphery. This arrangement I find to be more effective than carrying the oil on the interior of a trough-shaped disk. At the top of the disk the oil is removed by the spoon and discharged into the passages 32 and 38. Oil flows from the passage 32 to the longitudinal passages 33 and thence through openings 34 to longitudinal passages 35 where it effectively lubricates the axle bearing. Overflow from the upper end of passage 32 is directed by the conical part of disk 12 to the floating thrust bearing 24. Oil entering passage 38 passes to the floating thrust bearing 21 to lubricate it from the center and overflow from passage 38 falls down upon the thrust plate 20 and so assists in lubricating this bearing by applying oil to its periphery.

Having fully described my invention, what I claim as new and desire to secure by Letters Patent of the United States is:

1. In a device of the class described, the combination with an axle box, of a lid therefor, a sleeve bearing carried by the box, an axle in said bearing, a floating thrust bearing positioned between the end of the axle and the lid, an oil raising disk carried by the axle, a floating thrust bearing between the sleeve baring and the disk, and a spoon cooperating with the periphery of the disk to remove oil therefrom and discharge it in two directions, one oil discharge lubricating the first named thrust bearing, the other oil discharge lubricating the second named thrust bearing and the axle bearing.

2. In a device of the class described, the combination with an axle box, of a lid therefor, a sleeve bearing carried by the box, an axle in said bearing, a disk interposed between the lid and axle and forming a floating thrust bearing for the latter, an oil raising disk, means for securing said disk to the axle, said means including a peripheral groove in the axle, a divided locking ring having an inwardly projecting flange entering the groove and a laterally projecting flange forming retaining means for the thrust bearing, the outer face of said ring being beveled, a retaining ring having an inner beveled face engaging the outer face of the locking ring, and means for forcing the retaining ring laterally to clamp the lock ring in position.

I. EUGENE COX.